(12) United States Patent
Claudatos et al.

(10) Patent No.: US 8,468,604 B2
(45) Date of Patent: Jun. 18, 2013

(54) METHOD AND SYSTEM FOR DETECTING MALWARE

(75) Inventors: Christopher Hercules Claudatos, San Jose, CA (US); Jason A Baim, Providence, RI (US); Daniel S Cobb, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 823 days.

(21) Appl. No.: 11/541,413

(22) Filed: Sep. 29, 2006

(65) Prior Publication Data

US 2008/0047013 A1    Feb. 21, 2008

Related U.S. Application Data

(63) Continuation-in-part of application No. 11/505,559, filed on Aug. 16, 2006, now Pat. No. 8,255,998.

(60) Provisional application No. 60/708,969, filed on Aug. 16, 2005.

(51) Int. Cl.
*G06F 12/16* (2006.01)
(52) U.S. Cl.
USPC .......................................................... 726/24
(58) Field of Classification Search
USPC .................................. 726/22, 24, 5; 707/4, 201
See application file for complete search history.

(56) References Cited

U.S. PATENT DOCUMENTS

| | | | |
|---|---|---|---|
| 6,611,850 B1 | 8/2003 | Shen | |
| 7,155,465 B2 | 12/2006 | Lee et al. | |
| 7,784,098 B1 | 8/2010 | Fan et al. | |
| 7,936,682 B2 * | 5/2011 | Singh et al. | 370/241 |
| 2002/0138760 A1 | 9/2002 | Naitoh | |
| 2003/0056139 A1 | 3/2003 | Murray et al. | |
| 2004/0010732 A1 | 1/2004 | Oka | |
| 2004/0030913 A1 | 2/2004 | Liang et al. | |
| 2005/0131900 A1 | 6/2005 | Palliyll et al. | |
| 2005/0132206 A1 | 6/2005 | Palliyil et al. | |
| 2005/0240813 A1 | 10/2005 | Okada et al. | |
| 2006/0236392 A1 | 10/2006 | Thomas et al. | |
| 2006/0259587 A1 * | 11/2006 | Ackerman et al. | 709/219 |
| 2007/0143827 A1 * | 6/2007 | Nicodemus et al. | 726/2 |
| 2007/0244920 A1 | 10/2007 | Palliyil et al. | |

FOREIGN PATENT DOCUMENTS

| CN | 1371050 A | 9/2002 |
|---|---|---|
| CN | 1595366 A | 3/2006 |

* cited by examiner

*Primary Examiner* — Brandon Hoffman
(74) *Attorney, Agent, or Firm* — Theodore A. Chen; Krishnendu Gupta

(57) ABSTRACT

A method for protecting objects in a computer system against malware is disclosed. An object is analyzed to determine whether it is infected by malware, and if it is determined to be infected, a backup copy of the object is located in a backup of the objects. The infected object is replaced with the backup copy.

16 Claims, 4 Drawing Sheets

METHOD AND SYSTEM FOR DETECTING MALWARE

CROSS REFERENCE TO OTHER APPLICATIONS

This application claims priority to co-pending U.S. patent application Ser. No. 11/505,559 for INFORMATION PROTECTION METHOD AND SYSTEM, filed Aug. 16, 2006, which is incorporated herein by reference for all purposes.

FIELD OF THE INVENTION

This invention relates generally to protecting information against viruses, and more particularly to systems and methods for detecting attacks, protecting information, and recovering from attacks.

BACKGROUND OF THE INVENTION

This invention relates to a system and method for protecting computer files and/or objects against computer viruses, including malware. In the context of computers and machines, a virus is a self-replicating/self-reproducing-automation program that spreads by inserting copies of itself into other executable code or documents. Though the term "virus" may be defined as a type of malware (malicious software), it is common to use "virus" to refer to any kind of malware, including worms, Trojan horses, spyware, adware, etc.

Computer antivirus programs are commonly used to detect, clean, and remove computer viruses from infected objects such as data files. One form of detection typically used is scanning of objects resident on a hosting computer system's storage device(s). Objects are scanned for the presence of an embedded virus, and the scanning may be either signature-based or heuristic (such as watching for suspicious behavior). However, signature-based virus scanning relies on signatures obtained from previously-identified viruses and does not detect viruses that have not yet been identified and analyzed ("day-zero" or "zero-day" attacks). These are attacks that have no known solution and/or detection signature. Existing heuristic methods are not foolproof and may fail to detect virus attacks. Thus, antivirus programs may not know that an object has been infected.

These forms of attack pose serious threats to system operation and data integrity. An IPS/IDS (intrusion protection system/intrusion detection system) may be used to guard against day-zero attacks, by detecting anomalous behavior and applying policies that define the system's response. Responses may include notifying the administrator of the problem, limiting port usage, limiting bandwidth, and ultimately isolating the affected computer from the network. It is then up to the administrator to resolve the problem. The problem is usually not solved per se. Instead, the problem is forwarded to the antivirus provider or an attempt is made to restore the system to some point in time prior to the attack.

After a virus has been detected in an object, responses typically involve cleaning or repairing the infected object (the object containing the virus), deleting the infected object, or quarantining the infected object to block further access. Deleting or quarantining the infected object has the disadvantage of making it unavailable for further use. Thus, an attempt may be made to clean or repair the object. Sometimes, however, it is difficult if not impossible to repair the object using existing methods, and the resulting object may be damaged, leaving deletion or quarantine as the only remaining options. Even in cases when the object is successfully cleaned, the process may leave artifacts that result in an object that does not match the uninfected object. The artifacts may be benign and the object usable, but they may be considered unacceptable in some cases, such as by financial institutions. The cleaned object may not have the correct date and timestamp because the time of infection is unknown.

Restoring to a point in time prior to the attack may be problematic, because the administrator does not know when the infection actually occurred. All the administrator knows is when the attack became active. Many attacks lie dormant—sometimes for months or years—and thus, it is not readily apparent when the infection occurred.

There is a need, therefore, for an improved method, article of manufacture, and apparatus for protecting information against viruses on a computer system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

An embodiment of the invention will be described with reference to a computer system on which an information protection program executes, but it should be understood that the principles of the invention are not limited to this particular configuration. Rather, they may be applied to any system in which files or objects are stored, either on a local or remote device, and the device may comprise one or more storage devices. Although the information methods herein are described in terms of their application to protecting information from virus attacks, one skilled in the art will recognize that they are equally applicable to other cases for which it is desirable to detect unusual changes to objects or allow a user to restore the object to a point preceding the unusual change. Disclosed herein are a method and system to detect virus attacks, and to restore infected objects to a pre-infection state. Users are provided with the ability to detect and eradicate day-zero malware as well as countermeasure solutions that can identify and locate compromised objects, restore damaged objects, and scour the enterprise for objects that are suspected to have been infected with malware. An intrusion protection system/intrusion detection system ("IPS/IDS") may be combined with archiving and threat analysis as described herein.

Figure 1:
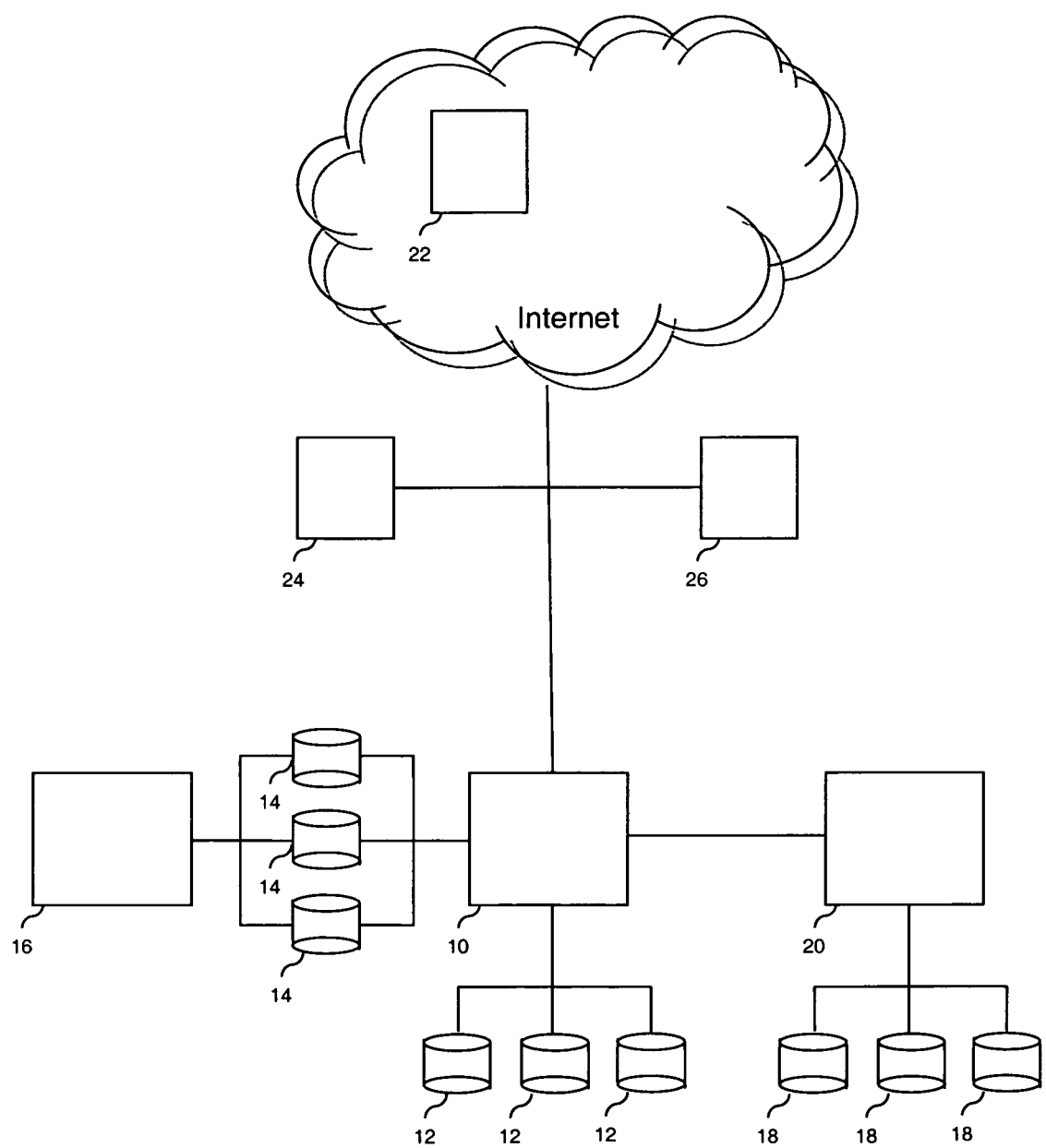
FIG. 1 is a diagram of an embodiment of a system in accordance with the invention.

FIG. 1 shows several possible configurations in which a program executing on a computer system 10 could be used to protect objects and the information they contain against viruses—on dedicated local storage devices 12, on storage devices 14 shared with another computer system 16, or on storage devices 18 associated with another computer system 20. Computer system 10 may communicate with computer system 20 or any other device via a network or other means of communication. Computer system 10 is in communication with the Internet, and may be configured to receive virus definitions/updates from an antivirus vendor 22, though it should be understood that virus definitions/updates may be received by other means such as by physical media.

A network-based IPS/IDS 24 may be used, and communicate with the program executing on computer system 10 to provide, for example, information about suspicious network activity and the identity of the host that originated it. The functionality of the IPS/IDS 24 may in one embodiment be provided in another computer system attached to the network, or agents may be placed on any or all of the computer systems to monitor activity. A backup system 26 may be provided for backing up data from the computer systems. Backup system 26 may include hard disk drives, optical drives, tape libraries, and other storage devices (not shown), and may execute a backup program for backing up data from the computer systems, which may have backup clients in communication with the backup program. Other configurations are possible, such as executing the backup program on another computer system, backing up data to a SAN or NAS device (not shown), or storage devices attached to the backed-up computer systems. In some configurations, the backup may comprise several types of storage groups, such as a backup pool that uses online or near-line storage (such as hard drives) and an archive that uses off-line storage (such as tapes). The principles disclosed herein apply to any configuration of the backup. Computer system 10 may include a display and input devices for interaction with a user, or the user may interact with computer system 10 from a remote location.

In an embodiment, after a virus has been detected in an object, responses may include cleaning or repairing the infected object, deleting the infected object, quarantining the infected object, or replacing the infected object with a clean object. This may be performed automatically, or upon instructions from the user. After determining that an object is infected, a backup copy of the object may be identified for replacing the infected object. After confirmation from the user, or automatically, the infected object may be replaced with the backup copy.

In an embodiment, there may be a plurality of backup copies. It should be understood that "backup copies" may be used to refer to complete backup copies as well as updates that are taken periodically and can be combined with backup copies to permit restoration to a point in time. That is, a backup may be made that captures the changes between the current backup point and the last backup (which may be a full backup or another backup of changes since the previous backup). A "backup copy" could be considered to be a restore point for the object. Thus, a plurality of restore points may be available for an object. If continuous data protection is being used, the system may have the ability to restore the object to any point in time. A backup copy of the object may have been made before the attacking virus was known, and could be infected. Having a plurality of backup copies increases the probability of having a clean copy of the object.

Because backup copies may have been made before the attacking virus was known, but after the virus attack (i.e., a "day-zero" or "zero-day" attack), they may be infected. In an embodiment, the system may be configured to search the backup for a clean copy of the object. Once the clean copy is identified, it may be submitted to an antivirus engine for confirmation that it is clean, and then used to replace the infected object. The user is not required to interact with or search the backup, and may simply select "replace" from a menu of choices to restore the object, rather than having to manually search for a replacement object or request assistance from IT support. This has the advantages of simplifying recovery for the user, reducing recovery time, and reducing recovery cost. Immediate replacement of the object reduces recovery time and cost, and increases availability of the object for use by applications and/or users.

Figure 2:
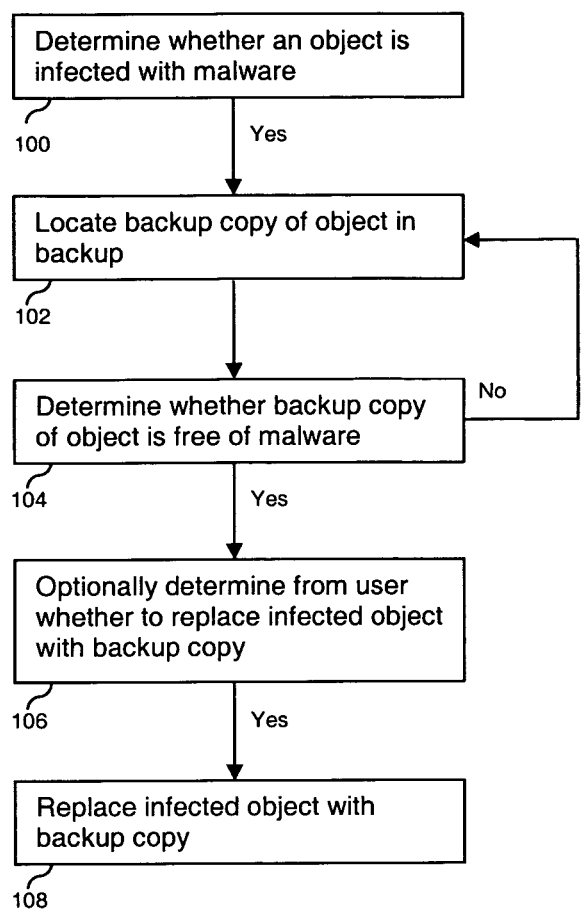
FIG. 2 is a flowchart illustrating an embodiment of a process for replacing infected objects.

FIG. 2 broadly illustrates a process flow in one embodiment. In step 100, it is determined whether the object is infected with malware. This determination may be made through analysis of the object, system behavior, and backup copies, or through an antivirus or malware scan, as described herein. If the object is infected, a backup copy of the object is located in the backup, step 102. This backup copy may be the most recent backup copy that has not been flagged as infected. In step 104, the backup copy is checked for malware, and if it is free of infection, the infected object is replaced with the backup copy, step 108. Optionally, a user may be asked whether to replace the infected object with the backup copy in step 106, and if the user accepts, step 108 is performed. If the backup copy is found to be infected, the process returns to step 102 and locates another backup copy. In an embodiment, a backup copy may be checked to see if it is unique. If it is the same as a backup copy that has already been located and checked, it may be skipped. Checking the backup copy for malware may in one embodiment include submitting it to an antivirus engine.

In one embodiment, the system 10 may determine a point in time when the infection occurred (the "infection point"), locate a backup copy that was made prior to the infection point, and replace the infected object with the backup copy. The backup copy may be chosen to be the most recent backup copy prior to the infection point. The determination of whether an object is infected and the infection point may be made by analyzing the object and its backup copies, as described herein. Upon making these determinations, a backup copy prior to the infection point may be selected and used to replace the infected object.

The antivirus program and/or backup program may be part of the program executing on computer system 10, another program, or executing on another computer system. The user interface may be provided on system 10, system 20, or another computer system for interaction with the program.

To identify a clean copy of an object, it is helpful to determine when the attack occurred. In an embodiment, the system may be used to identify which computer systems are compromised, which files are affected, and provide a recommended or automatic solution. The system looks for anomalous behavior by a computer system, such as by monitoring computer systems' network behavior. This may be performed, for example, by an IPS/IDS such as a network-based IPS/IDS that detect anomalous network behavior, or an agent-based IPS/IDS with an agent running on each monitored computer. When anomalous behavior by a computer system is detected, that system's logs may be used to identify the objects that initiated or are in some way related to the anomalous behavior, such as objects altered by execution of the malware. The inspection may be performed on native system log files, agent-based files (which may be more robust), or other data sources (such as processes) that may provide information helpful to identifying the object(s) relevant to the anomalous behavior. After identifying a relevant object, the system may search for copies of the object, to find a version of the object that is not infected with the presumed malware.

For day-zero attacks, there are no known signatures that can be used to identify the malware. In an embodiment, the system may monitor objects and backup copies of the objects for anomalous changes. Methods for detection and analysis of anomalous changes in objects may range from monitoring object size changes to performing pattern recognition on the objects' binary patterns. This may be done before or after the objects have been accessed. Based on this evaluation, the system can identify a point in time that most likely represents the infection point. Once this point is identified, backup copies created prior to this point are considered likely to be clean, and used as replacements for the infected objects. The backup copies may be scanned by an antivirus engine prior to their use as replacements. Virus signatures may have been added to the virus definitions since the backup copies were created, and those backup copies may have viruses whose signatures were not known at the time. In an embodiment, the backup copies may have hash signatures computed for each copy, and the hashes used to quickly identify unique versions. Only unique versions would be analyzed for malware or submitted to the antivirus engine, to avoid processing duplicates. Duplicate copies of an object may appear in the backup through full backups, and in that situation, only the first copy encountered would need to be processed. In one embodiment, object accesses may be analyzed for anomalous changes before they are performed, and if they are considered likely to be the result of malware, blocked.

Figure 3:
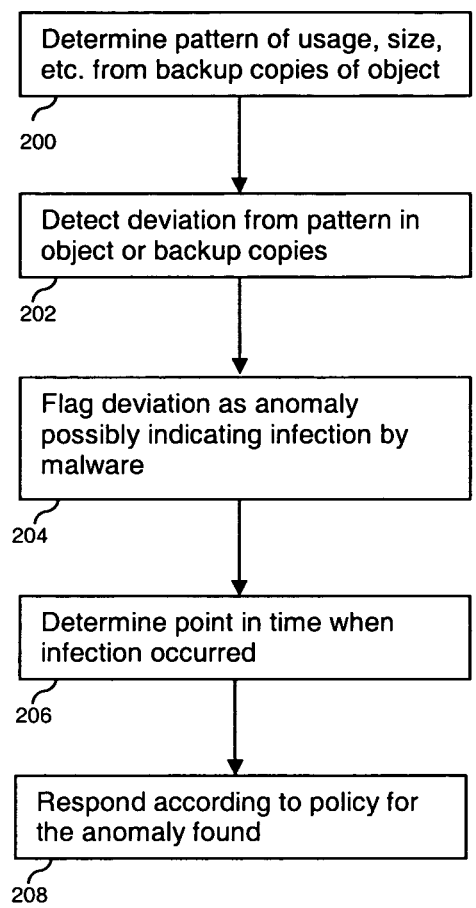
FIG. 3 is a flowchart illustrating an embodiment of a process for analyzing patterns to identify an infected object.

FIG. 3 is a flowchart illustrating a process in one embodiment for identifying anomalies. In step 200, the backup copies of an object are analyzed to determine a pattern (including trends) of usage, size, etc. as described herein. Step 202 involves monitoring for deviations from the pattern, and the deviation may be flagged as an anomaly possibly indicating infection by malware, step 204. The point in time at which the infection occurred may be determined, step 206. In step 208, a response may be formulated according to a policy for the anomaly. Policies may, for example, specify quarantining the suspected infected object, notifying an administrator, replacing the infected object with a clean backup copy, denying the attempted access, etc.

In an embodiment, an access log analysis may be performed to search for anomalous activity. Reads and writes may be logged together with a timestamp and optionally with other metadata such as source ID, application ID, user, etc. This metadata may be used to search for anomalous behavior. For example, if an unexpected user or application accesses an object, that may be considered anomalous. A Microsoft Word document would typically not be written to by any application other than Microsoft Word, so a write to the Word document by another application might be considered suspicious. Other cases might involve a multitude of reads of objects by an application or user other than the one that created or modified them, giving rise to a suspicion that malware is attempting to steal data and transmit it over the network to a remote location. This could be combined with monitoring the network for anomalous behavior, and observing that the computer is attempting to transmit a large amount of data to an unusual location.

An access log may also be used to roll-back writes to a point in time prior to the infection point. The access log may be associated with a backup pool. This method can be used alone or in conjunction with other methods to roll back to the appropriate copy or version of the object prior to the infection point. In an embodiment, if it can be determined which writes are the results of malware activity, those writes could be selectively omitted and the other, valid, writes could be applied to bring the object up to date, post-infection. A filter for malware writes might, for example, be based on certain metadata such as an originating application determined to have been infected by malware, and/or only applying writes issued by a valid application. As backup pools are ultimately moved to archives, the access logs associated with the formerly active backup pools may be consolidated and added to a master index of objects.

Size trending may in one embodiment be used as an indicator of an anomalous change. If an object's size is expected to remain static throughout its life, then a change in the object's size would be a clear indication that some anomaly has occurred. In an example, an object is suspected of being infected and has a current size of 256 KB. A search through the backup pool shows that object's size is consistent with all the versions retained within the backup pool. However, when the search is extended into the archive, it is found that until 120 days ago, all versions were 168 KB and have been 168 KB since the object was originally archived. This would lead to the conclusion that the 168 KB version of the object is a version that is free of the infection. If the 168 KB version appeared six months ago and that prior to that time the object was 80 KB, this would imply that the 80 KB object is the clean version and not the 168 KB object. The more versions that are kept in the backup, the greater the chance that a clean version will be found—if one ever existed.

Dynamically changing objects will likely have changing sizes in normal use. By analyzing object size changes over time, a trend of the size changes can be established. Using this information and applying statistical analysis, objects with anomalous changes may be identified, and the point of infection may be determined. Greater historical information may improve the accuracy of the analysis. Further, absence of an object size change when a size change is expected may also be an indication of anomalous behavior. The magnitudes of the size changes may also be considered. An unusually large change in size of a file could be an indication of suspicious activity. Thresholds for size changes may be set, such as by an administrator, according to a known profile for the object type, or according to an analysis of the object's size changes. Significant deviations may be flagged as anomalies. The threshold for significance may be set by an administrator, according to known profiles, or adjusted automatically as more data is collected.

In an embodiment, temporal trending may be used as an indicator of anomalous activity. An object may be expected to change size over its lifetime, or its data may change. The frequency, dates, and times of the changes may be used to identify anomalies. For example, an object might normally change size every day. Analysis of the backup shows that the object was always changed once a day, but 18 months ago, the object was changed twice in a single day. This could be considered an anomaly, and flagged as the infection point. Other types of access may also be considered.

In an example, an object may be opened, used, and changed every day Monday through Friday, from 8 AM-6 PM. Analysis of the backup indicates that on several occasions the object was changed on days and times outside the normal expected window. The likely point of infection may be found by looking back to the most distant (oldest) change that falls outside the expected window.

Objects may be changed in a patterned or ad hoc manner. By applying statistical analysis to the historical data, anomalous changes may be identified and help indicate suspected infection points in time. The absence of changes to an object at an expected time or interval may also be an indicator.

Figure 4:
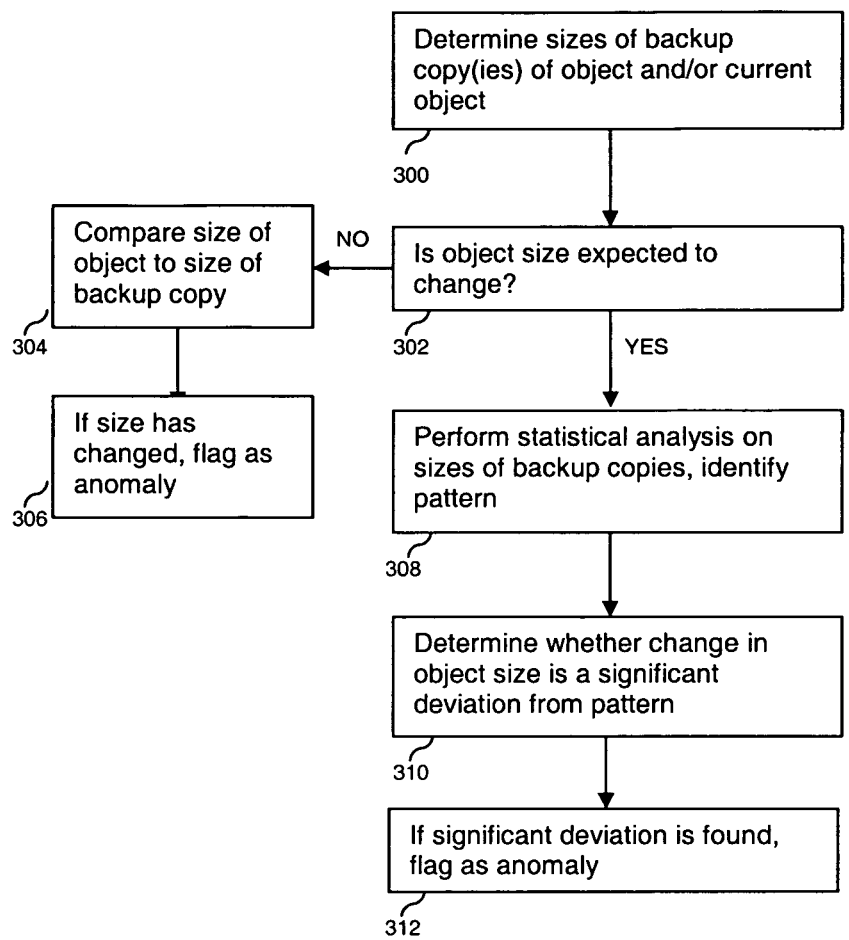
FIG. 4 is a flowchart illustrating an embodiment of a process for analyzing object sizes to identify an infected object.

FIG. 4 illustrates an embodiment of a process flow using changes in size to identify anomalies. In step 300, the process determines the sizes of the backup copies of the objects and the current object. It should be understood that the process could be used with backup copies only (such as malware scanning of files after performing a backup), and any backup copy might be analyzed with respect to other backup copies. If the object size is expected to change, step 302, the size of the current object may be compared to the size of a backup copy, step 304. If it is different, this deviation may be flagged as an anomaly, step 306. If the object size is expected to change, statistical analysis may be used to evaluate the sizes of the backup copies, step 308. Patterns may be determined from the statistical analysis, such as timing of changes in size, magnitude of size changes, sequence of size changes, etc. The object size is compared to the pattern to determine whether there is a significant deviation, step 310, and if a significant deviation is found, it may be flagged as an anomaly, step 312.

The analysis may in an embodiment include a determination of the location within the object where a change (or number of changes) occurs. For example, an object may be expected to change, and the change points (offsets from the beginning) within the object are constant. Analysis of the backup could identify objects having changes at offsets that are different from expected. Classification of an object as suspect could be based on a single change in the location of change in the object, or several changes in location. An object that is expected to change might always have the changed data appended to the end of the object. A search through the backup might identify objects that have been changed, but not at the end of the object as expected. These objects might be considered suspect.

Changes may occur at multiple locations (offsets) within the object, and may not consistently change in every location (i.e., at times some locations may change and some may not) even though the locations of the changes are consistent. This information may be used as search criteria, and objects having changes that fall outside of these criteria may be considered suspect. Normal patterns of changes may be determined, and unusual patterns may be identified as suspect.

In an embodiment, the system may look for the absence of changes to the object at specific locations within the object that are expected to occur upon every use of the object, or at certain intervals. Non-occurrences of expected changes may be used to flag an object or objects as suspect.

All or part of the contents of an object may change, while the object remains the same size. An infection might alter a known clean and harmless object by replacing the entire object (either by renaming, overwriting, or deleting the object and writing a new object, etc.) with a malicious object that is the same size as the original. This could be accomplished by replacing only objects that match the malicious object's own size, or replacing a larger object with the malicious object and simply padding the malicious object to increase its size to match the larger object's size. This would circumvent size-based analysis.

Binary profile trending may in one embodiment be used to identify anomalous activity, by analyzing the binary pattern of the object itself even if the object size does not change. For fixed size objects, the object's binary pattern over time may be analyzed and anomalous changes to the pattern identified. In one embodiment, each copy of an object may be hashed and the hash values compared. A mismatch in hash values would indicate a difference in the objects, giving rise to a suspicion that the object associated with the non-matching hash has been altered. Simple comparisons between the bits (or bytes or other data blocks) of the objects may also be performed in one embodiment.

Pattern recognition and/or trend analysis may be performed on an object or portions of the object, and the results compared with the backup to identify deviations. Parameters can be used to set the tolerance of variation, in order to pass objects containing acceptable changes and flag those objects containing likely unacceptable changes. Objects identified as containing unacceptable changes may be considered suspect.

In an embodiment, the system may determine, measure, and track the degree of changes within the object. For example, an object may be expected to change in random amounts in various locations, but there are portions of the object that are never expected to change. By identifying changes to these portions, suspect objects may be found. In another example, an object's change in overall size may be random, but there may be areas within the object where changes are expected but within certain limits. By identifying changes outside of the expected limits, suspect objects are identified. There may also be portions of an object where changes are expected to take place upon every use of the object (some may be associated with different types of use, such as read or write), or periodically at regular intervals. Absence of these expected changes may be used to identify an object as having anomalous activity.

Change agent tracking may be used in one embodiment to identify objects having anomalous activity. For example, if the source of the change and/or write to an object is unknown or unexpected, the activity may be regarded as anomalous. By tracking the origin of object changes/writes, it can be determined if the source of the change/write is not expected or unacceptable. Thus, if an object change or write comes from a program or process that is not either approved or is not the usual (based on history) program/process, then the object is flagged as suspect.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for protecting objects in a system comprising a backup including backup copies of the objects, the method comprising:
    determining a pattern associated with an object by performing a size-based analysis, using at least one backup copy from the backup copies of the object, wherein performing the size-based analysis includes determining a first size of the object selected from a group comprising a current size of the object and a size of a backup copy of the object and, determining a second size of another backup copy of the object, wherein determining the pattern includes determining modification times of the backup copies of the object and, deriving a frequency of modification based on the modification times of the backup copies of the object;
    detecting a deviation from the pattern to identify an anomaly indicating that the object is infected by malware, wherein detecting the deviation from the pattern includes comparing the first size to the second size based on a size change threshold for the object and, analyzing a binary pattern of the object if the first size is same as the second size, wherein detecting the deviation from the pattern includes identifying a change to a first portion of the object that is expected to remain the same, wherein detecting the deviation from the pattern includes identifying an absence of a change to a second portion of the object that is expected to change, wherein the first and second portions of the object are located at respective first and second offsets within the object;
    determining a magnitude of the deviation from the pattern; and
    comparing the magnitude of the deviation to a threshold, wherein the threshold is determined according to known object profiles.

2. The method as recited in claim 1, wherein detecting the deviation from the pattern to identify an anomaly includes returning a positive result if the first size is larger than the second size.

3. The method as recited in claim 1, further comprising determining a size change threshold for the object, and wherein detecting the deviation from the pattern to identify an anomaly includes returning a positive result if the first size is larger than the second size by at least the size change threshold.

4. The method as recited in claim 1, further comprising determining size change thresholds for a plurality of objects.

5. The method as recited in claim 1, wherein determining the pattern includes determining sizes of backup copies of the object, and performing statistical analysis on the sizes of backup copies.

6. The method as recited in claim 5, wherein detecting a deviation from the pattern to identify an anomaly includes analyzing a size of the object or a size of a backup copy of the object with respect to the sizes of the backup copies.

7. The method as recited in claim 6, wherein detecting a deviation from the pattern to identify an anomaly further includes returning a positive result if the size of the object or a size of a backup copy of the object is larger than a size predicted by the statistical analysis.

8. The method as recited in claim 1, wherein detecting a deviation from the pattern to identify an anomaly includes returning a positive result if a modification time of the object or a modification time of a backup copy of the object is inconsistent with the derived frequency.

9. The method as recited in claim 1, wherein detecting a deviation from the pattern to identify an anomaly includes returning a positive result if a modification time of the object occurs earlier than a modification time predicted from the derived frequency.

10. The method as recited in claim 1, wherein detecting a deviation from the pattern to identify an anomaly includes returning a positive result if a modification time of the object occurs later than a modification time predicted from the derived frequency.

11. The method as recited in claim 1, further comprising determining an infection point in time when the object became infected by malware.

12. The method as recited in claim 11, wherein the infection point is determined from a time of occurrence of the identified anomaly.

13. The method as recited in claim 12, further comprising retrieving a backup copy made prior to the infection point.

14. The method as recited in claim 13, further comprising replacing the object with the retrieved backup copy.

15. A computer program product for protecting objects in a system comprising a backup including backup copies of the objects, the computer program product being embodied in a non-transitory computer readable medium and comprising computer instructions for:
    determining a pattern associated with an object by performing a size-based analysis, using at least one backup copy from the backup copies of the object, wherein performing the size-based analysis includes determining a first size of the object selected from a group comprising a current size of the object and a size of a backup copy of the object and, determining a second size of another backup copy of the object, wherein determining the pattern includes determining modification times of the backup copies of the object and, deriving a frequency of modification based on the modification times of the backup copies of the object;
    detecting a deviation from the pattern to identify an anomaly indicating that the object is infected by malware, wherein detecting the deviation from the pattern includes comparing the first size to the second size based on a size change threshold for the object and, analyzing a binary pattern of the object if the first size is same as the second size, wherein detecting the deviation from the pattern includes identifying a change to a first portion of the object that is expected to remain the same, wherein detecting the deviation from the pattern includes identifying an absence of a change to a second portion of the object that is expected to change, wherein the first and second portions of the object are located at respective first and second offsets within the object;

determining a magnitude of the deviation from the pattern; and comparing the magnitude of the deviation to a threshold, wherein the threshold is determined according to known object profiles.

16. A system for protecting objects, comprising a backup including copies of the objects, and a processor configured to:

determine a pattern associated with an object by performing a size-based analysis, using at least one backup copy from the backup copies of the object, wherein performing the size-based analysis includes determining a first size of the object selected from a group comprising a current size of the object and a size of a backup copy of the object and, determining a second size of another backup copy of the object, wherein determining the pattern includes determining modification times of the backup copies of the object and, deriving a frequency of modification based on the modification times of the backup copies of the object;

detect a deviation from the pattern to identify an anomaly indicating that the object is infected by malware, wherein detecting the deviation from the pattern includes comparing the first size to the second size based on a size change threshold for the object and, analyzing a binary pattern of the object if the first size is same as the second size, wherein detecting the deviation from the pattern includes identifying a change to a first portion of the object that is expected to remain the same, wherein detecting the deviation from the pattern includes identifying an absence of a change to a second portion of the object that is expected to change, wherein the first and second portions of the object are located at respective first and second offsets within the object;

determine a magnitude of the deviation from the pattern; and compare the magnitude of the deviation to a threshold, wherein the threshold is determined according to known object profiles.

* * * * *